United States Patent [19]
Carpenter et al.

[11] Patent Number: 5,331,867
[45] Date of Patent: Jul. 26, 1994

[54] WIRE INSULATION CUTTING AND STRIPPING APPARATUS

[75] Inventors: Thomas S. Carpenter; David D. Hand, both of New York, N.Y.

[73] Assignee: Carpenter Manufacturing Co., Inc., Manlius, N.Y.

[21] Appl. No.: 962,851

[22] Filed: Oct. 19, 1992

[51] Int. Cl.$^5$ .............................................. H02G 1/12
[52] U.S. Cl. ........................................ 81/9.51; 81/9.41
[58] Field of Search ..................... 81/9.51, 9.4, 9.41, 81/9.42, 9.43, 9.44

[56] References Cited

U.S. PATENT DOCUMENTS

| | | | |
|---|---|---|---|
| 3,176,550 | 4/1965 | Marcotte | 81/9.51 |
| 3,838,612 | 10/1974 | Inami | 81/9.51 |
| 4,614,135 | 9/1986 | Ito et al. | 81/9.51 |
| 5,072,632 | 12/1991 | Sayyadi | 81/9.51 |
| 5,111,720 | 5/1992 | Stepan | 81/9.51 |

FOREIGN PATENT DOCUMENTS

0359891  3/1990  European Pat. Off. ............ 81/9.51

*Primary Examiner*—D. S. Meislin
*Attorney, Agent, or Firm*—Charles S. McGuire

[57] ABSTRACT

Apparatus for cutting, severing and stripping a portion of a covering layer, such as insulation, from the end of a filamentary core material, such as an electrical conductor. The apparatus includes means for clamping the workpiece to restrain axial movement thereof and a pair of blades which move radially of the workpiece to cut the insulation and then axially to complete the severing operation and strip the severed slug fully or partly from the conductor. The apparatus is powered by a pneumatic cylinder and includes means for automatically varying the clamping force on the workpiece commensurately with the axial pulling force exerted by the blades during severing and stripping. Unique mounting and moving means for the blades and workpiece clamping members are provided to permit pivotal mounting of the blade and clamping member supports while constraining reciprocal movement thereof radially of the workpiece to a linear path.

31 Claims, 6 Drawing Sheets

WIRE INSULATION CUTTING AND STRIPPING APPARATUS

BACKGROUND OF THE INVENTION

1. Field Of The Invention

The present invention relates to apparatus having blades for cutting through a layer coating material on a filamentary core, and for stripping the severed material fully or partly from a terminal end of the core. For example, the apparatus may operate upon an electrical wire to sever and strip a slug of insulation from the end of the conductor. More particularly, a principal aspect of the invention concerns improvements in such apparatus providing automatic adjustment of the clamping force applied to the wire to prevent axial movement thereof as the insulation is severed and stripped; another aspect of the invention relates to the means for mounting and reciprocally moving the cutting blades. Other features of the invention relate to improvements in the construction and relative arrangement of elements of pneumatically operated wire insulation cutting, severing and stripping apparatus.

2. Related Prior Art

Many forms of both manually and power operated apparatus have been provided for high volume severing and stripping of coating layers from filamentary core materials such as electrical wires and optical fibers. An example of manually manipulated apparatus of this type, including means for gripping the wire as a pair of blades move radially of the wire to cut the insulation and then axially to strip the severed slug of insulation from the conductor, is described in U.S. Pat. No. 2,313,793 of Wood. Electrically powered apparatus for performing similar operations is found in U.S. Pat. Nos. 4,933,147 and 4,933,287 of Carpenter et al. Pneumatically and combined electrically-pneumatically powered apparatus of this type is also commercially available.

One of the requirements of such apparatus is that the workpiece must be restrained against axial movement as an axial force is applied to the coating material which is to be separated from the remaining material. The most common means employed to restrain axial movement of the workpiece is a pair of gripping or clamping members between which the workpiece is firmly engaged as the axial force is applied. The gripping force applied to the workpiece, which may be provided, e.g., by spring biasing the clamping members toward a closed position, must be great enough to prevent axial movement of the workpiece when the greatest axial force contemplated during normal operation is applied. Thus, the radial clamping force is often greater than that which would actually be required for a given severing and stripping operation, and raises the possibility of damage to the workpiece.

In addition, although it is often expedient to provide the gripping force through a pair of pivotally mounted clamp arms, difficulties are sometimes experienced with such arrangements. Since the apparatus is preferably suitable for operating upon workpieces of different diameters, the opposed clamping surfaces of pivotally mounted arms will assume different angular relationships to one another when engaging different workpieces. This may exert an undesirable radial force on the workpiece, particularly when relatively high gripping forces are applied, i.e., the workpiece may slip on the gripping surfaces and/or be damaged thereby. It is therefore desirable to provide clamping means which retain the advantages of pivotal mounting while engaging the workpiece between reciprocally moveable surfaces which remain parallel during such movement.

While some apparatus of the type under consideration employs rotating blade means to cut entirely around the workpiece, others use a pair of blades having V-shaped cutting edge cooperatively defining a four-sided aperture with means for reciprocally moving the blades radially of the workpiece. Although the most mechanically expedient means for mounting the blades is often for pivotal movement, it is more difficult to maintain precise alignment of pivotally than of linearly reciprocating blades. It is also necessary, in either case, to provide linearly reciprocating movement of the blades axially of the workpiece to complete severing of the coating material and stripping the severed slug fully or partially from the terminal end of the core. Thus, there exists a need for convenient and economical blade mounting means which also ensure precise blade alignment.

Some prior art apparatus utilizes a single motive means, e.g., a pneumatic cylinder, intended after a single actuation to provide sequential motion to elements of the apparatus. The clamping arms must be moved first in order to grip the workpiece, the blades are then moved radially of the workpiece to cut through the outer layer, and the blades are then moved axially of the workpiece to complete severing and stripping of the severed slug from the inner core. Frictional drag means are provided to inhibit movement of the blades until the workpiece is firmly clamped. Although spring tension means may be employed for selective adjustment of the frictional force opposing movement of blades axially of the workpiece, reliability of operation would be enhanced by means which lock the blade movement elements in place until a predetermined force is applied.

OBJECTS OF THE INVENTION

It is an object of the present invention to provide apparatus of the character described having structure which automatically adjusts the clamping force applied to the workpiece to the level required to offset axial pulling forces exerted thereon.

Another object is to provide apparatus having a pair of cutter blades reciprocally movable toward and away from one another to cut portions of a workpiece positioned between the blades with mounting means which combine the advantages of pivotal and linear movement of the blades.

A further object is to provide pneumatically operated apparatus for cutting and stripping insulation or other covering layers from the ends of electrical wires, or the like, having novel and improved combinations of elements and structural relationships thereof which contribute to reliability and simplicity of operation, as well as economy and durability of operation.

Still another object is to provide means for gripping an elongated workpiece to restrain axial movement thereof during a severing and stripping operation which combines the advantages of both pivotal and linear movement of elements of the gripping or clamping mechanism.

A still further object is to provide, in apparatus having a single motive means for performing multiple operations (gripping, cutting and severing/stripping) on a workpiece, positive yet resilient motion-restraining means for moveable elements of the apparatus which ensure operation in a desired sequence.

Other objects will in part be obvious and will in part appear hereinafter.

SUMMARY OF THE INVENTION

In the disclosed embodiment, the apparatus of the invention comprises a rigid frame including a pair of longitudinally extending guide rails, a pair of pivotally moveable wire clamping arms, a pair of cutter blades and a pneumatic cylinder with a separately mounted control valve. The clamping arms are spring biased toward one another at their lower ends, thereby biasing the upper ends, between which the wire is gripped, away from one another. A conical element on the end of the cylinder operating rod is moved between the lower ends of the clamping arms to move the upper ends toward one another to grip the workpiece at the beginning of a cycle.

Operation is initiated by axial insertion of the workpiece, between the open clamping arms and blades, to contact a plunger, causing the control valve spool to shift and provide positive air pressure to the rear end of the cylinder. This causes the cylinder rod to move forward, thereby closing the upper ends of the clamping arms on the workpiece. continued application of air pressure between the piston and the rear end of the cylinder produces rearward movement of the cylinder which is affixed to a mounting plate slidingly moveable on the guide rails.

A fixed post which is moveable with the cylinder extends through elongated slots in a pair of pivotally mounted blade support arms. The two blades are respectively affixed to a pair of blocks, which in turn are pivotally mounted upon the forward ends of the support arms. As the cylinder and post move rearwardly, movement of the post in the support arm slots causes the arms to pivot about their mountings on a second mounting plate slidingly moveable on the guide rails. This movement of the support arms causes the blade mounting blocks, and thus the blades themselves, to move toward one another.

A rod extends from one mounting block into a sleeve extending from the other block. due to the pivotal mounting of the mounting blocks on the support arms and the telescoping engagement of the rod and sleeve, movement of the blades is constrained to a linear rather than an arcuate path. An adjustable stop screw in the sleeve defines the limit of movement of the blades toward one another, thereby defining the depth of cut.

Continued rearward movement of the cylinder and fixed post, after the blades have reached the inner limit of their travel, causes rearward movement of the support arms, mounting blocks and blades together with the second mounting plate. This exerts an axial pulling force on the workpiece since the cutting edges blades are engaged with the insulation or other coating layer. Since air pressure is exerted equally on the piston, tending to move the conical element further between and clamping arms, and the rear end of the cylinder, tending to move it and other elements including the blades rearwardly, the gripping force on the workpiece is increased commensurately with the axial force applied thereto.

The rearward limit of movement of the cylinder and other elements is defined by contact of a plate attached to the cylinder with a plunger on the control valve. This shifts the valve spool to provide positive air pressure to the forward end of the cylinder, thereby retracting the operating rod and releasing the clamping arms from the workpiece. Continued application of pressure moves the cylinder and fixed post forwardly, thus causing the support arms to pivot and move the mounting blocks and blades away from one another, then causing forward movement of these elements with the second mounting plate until detent members therein engage grooves in the guide rails. The apparatus is then ready to begin another cycle.

In an alternate embodiment, the pivotally mounted clamping arms are slotted at their upper ends to accommodate a pair of clamp blocks which are also pivotally mounted upon the respective arms. The blocks have opposing surfaces between which the workpiece is engaged when the arms are pivoted to move the upper ends thereof toward one another. A guide pin extending fixedly from one of the clamp blocks is slidingly received in an opening in the other, thus ensuring that the opposing clamping surfaces remain in the desired parallel relationship during movement toward and away from the workpiece.

The foregoing and other features of construction and operation of the apparatus will be more readily understood and appreciated from the following detailed description, taken in conjunction with the accompanying drawings wherein:

DETAILED DESCRIPTION

Referring now to the drawings, the elements which perform the cutting, severing and stripping operations are shown in FIGS. 4–11. These elements are advantageously housed in a two-part casing 10, shown only in FIG. 1, comprising base and cover portions 12 and 14, respectively. An opening is provided in the front side of cover 14 for transparent, plastic guard 16 having elongated, open slot 18 for free passage of the end of an elongated workpiece 20. Cover 14 is movable relative to base 12 between the closed position of FIG. 1, and an open position, providing access to the elements inside, about a hinge (not shown) running laterally across the rear of the apparatus.

Figures 1, 2:
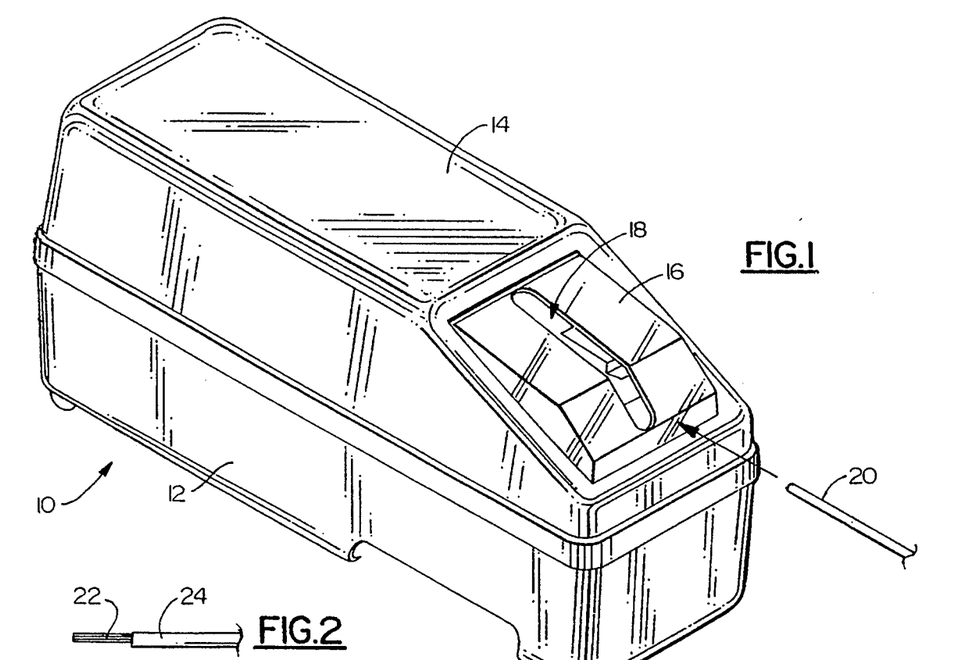
FIG. 1 is a perspective view showing the external configuration of the apparatus, all other views being shown without the outer, protective casing.
FIGS. 2 and 3 are fragmentary, elevational views of the free ends of wires operated upon by the apparatus.
Figure 3:
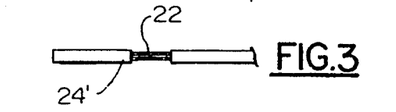

Although it will be understood that the apparatus of the invention may be used to operate upon any elongated workpiece having a filamentary core coated with one or more layers of severable material(s), workpiece 20 will for convenience of discussion be considered and referred to as a conventional, electrical wire having a single layer of insulating material. Such a wire is shown in FIGS. 2 and 3, consisting of electrically conducting, inner core 22 and covering layer 24 of plastic or other insulating material having a substantially uniform thickness. As will be seen, the apparatus of the invention is adapted to cut radially, partially through insulation 24 at selectively adjustable lengths (i.e., distance from the terminal end of the wire) and radial depths and then to sever the insulation at the position of the cut by exerting an axial pulling force on the insulation while holding the wire in a fixed axial position. The apparatus is further adjustable to cause the severed slug of insulation to be removed completely from the conductor, as shown in FIG. 2, or to be only partially stripped and remain on the conductor, as in the case of severed slug 24′ in FIG. 3.

Figure 4:
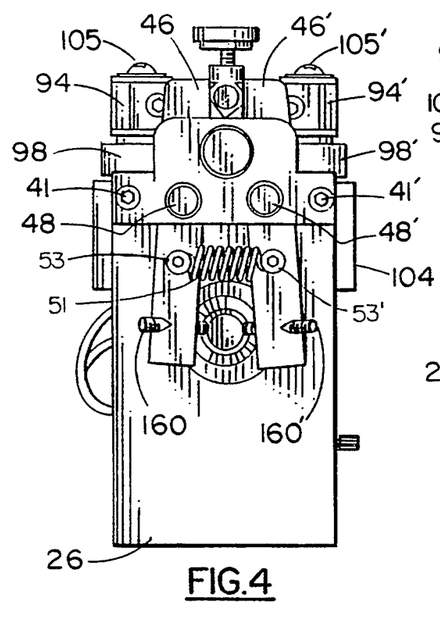
FIGS. 4 and 5 are front rear elevational views, respectively, of the complete mechanical assembly.
Figure 5:
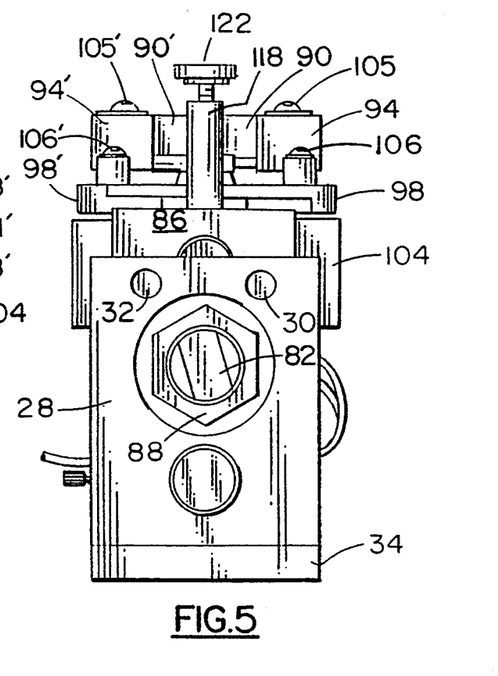
Figure 6:
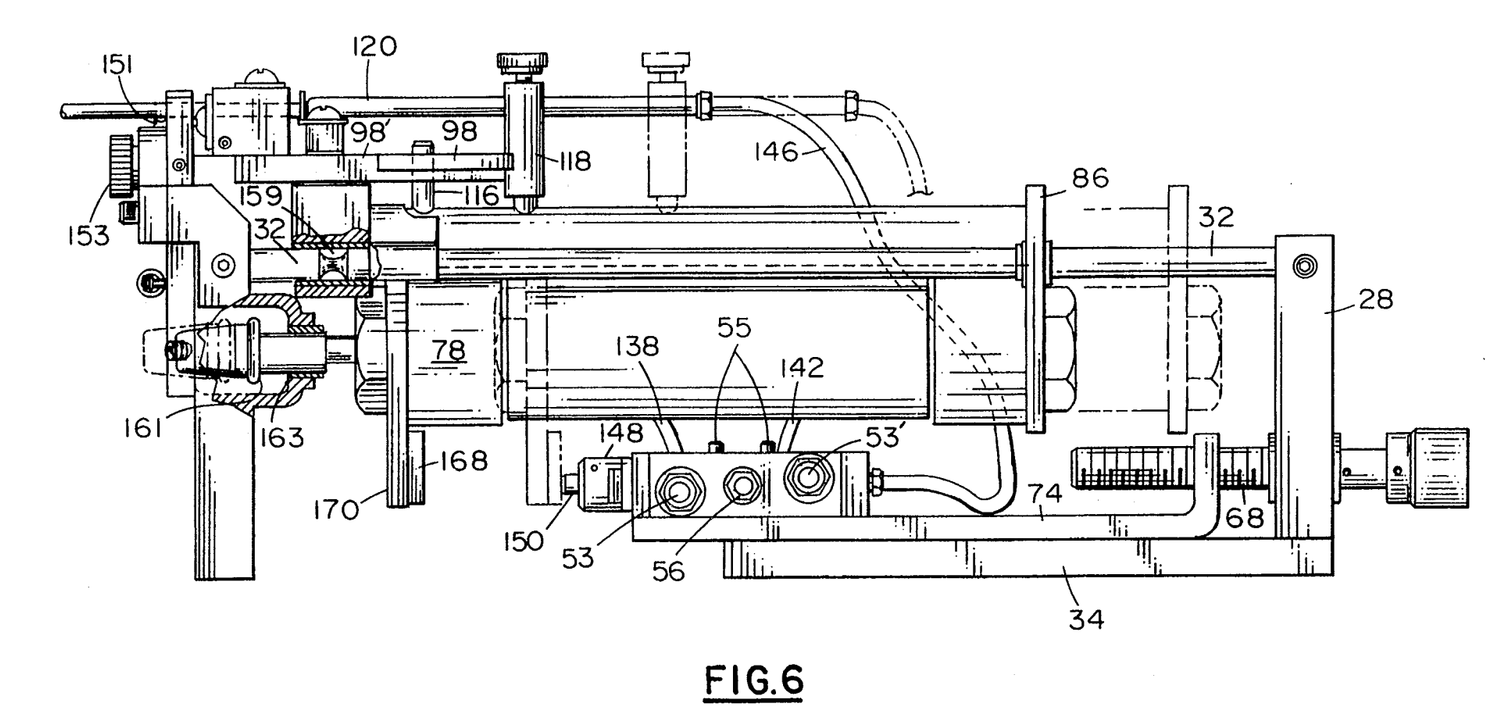
FIGS. 6 and 7 are right and left side elevational views, respectively.

The operating elements of the apparatus housed within casing 10 are shown in FIG. 4 as they would appear directly behind guard 16, i.e., from what is considered the front of the machine. The movable elements are supported on a fixed frame which is attached to casing base 12. Referring now to FIGS. 4–11, the frame includes front and rear frame members 26 and 28, respectively, support rails 30 and 32, valve mounting plate 34, and clamp plate 36. Support rails 30 and 32 are fixedly attached at their opposite ends in openings 31 in front frame member 26 and openings 33 in rear frame member 28. Plate 34 is fixedly attached by screws 38 to rear frame member 28; clamp plate 36 is affixed to front frame member 26 by screws 41, 41′ (FIG. 4) passing through openings 42 in plate 36 and secured in tapped openings 44 in front frame member 26. The rigid frame is affixed to casing base 12 by screws 45 and 45′ (FIG. 11), each passing through tapped openings in base 12 and into tapped openings in front frame member 26 and valve mounting plate 34, respectively.

Clamp arms 46, 46′ are pivotally mounted between front frame member 26 and clamp plate 36 for movement about posts 48, 48′, which extend fixedly from the respective clamp arms into openings 50 in clamp plate 36, and a like pair of posts (not shown) coaxial with posts 48, 48′ and extending from the opposite sides of arms 46, 46′ into openings 49 in front frame member 26. Spring 51 is attached at its opposite ends to screws 53, 53′ to bias clamp arms 46, 46′ toward rotation in counterclockwise and clockwise directions, respectively, as viewed from the front of the apparatus. That is, the lower ends of the clamp arms (below pivot posts 48, 48′) are biased toward, and the upper ends away from one another to what is termed the open position of the clamp arms.

Figure 7:
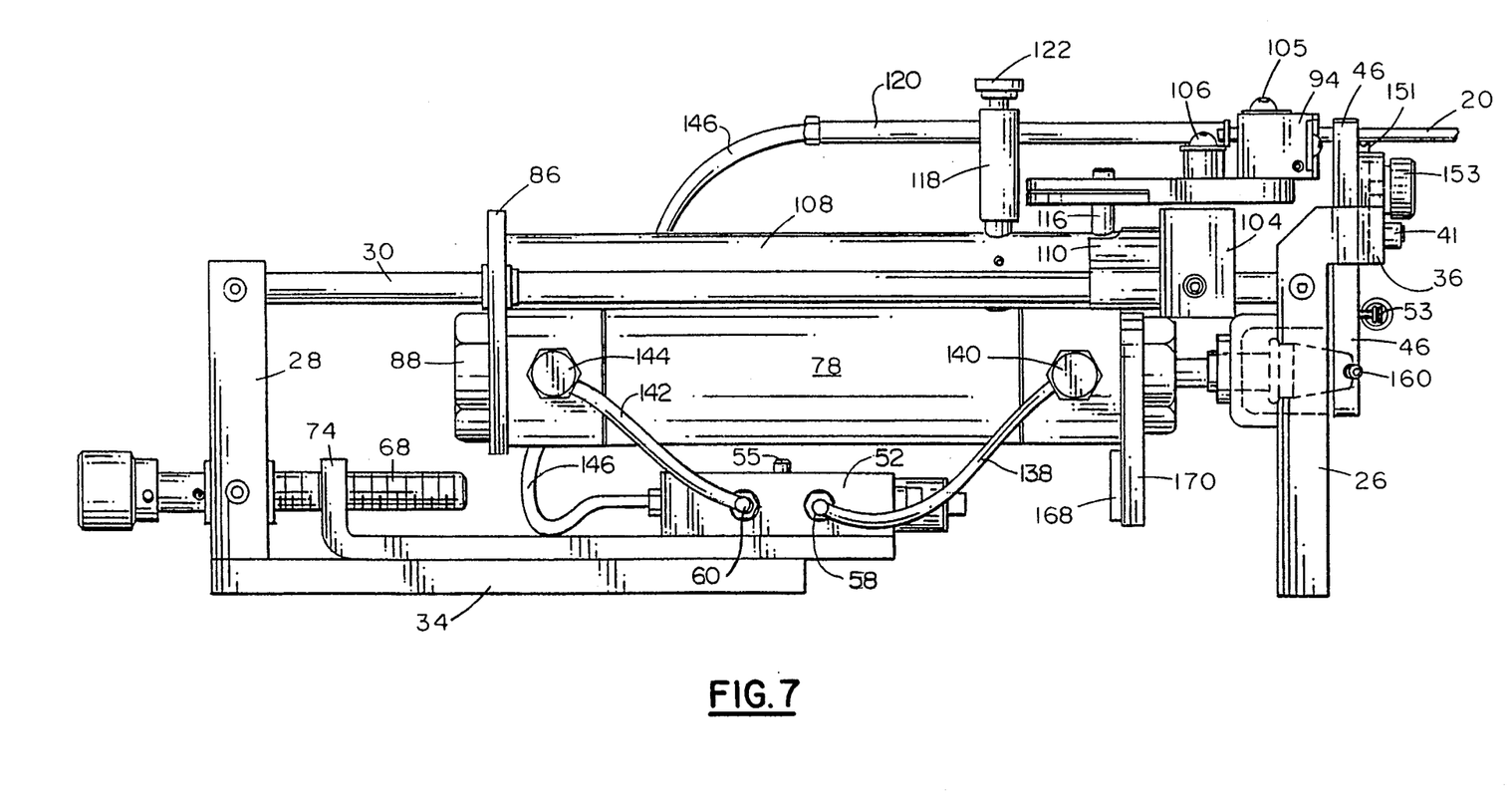

Pneumatic valve 52 includes a body portion fixedly attached by screws 55 to valve adjusting plate 54, an axially shiftable spool within an internal cavity of the body, air inlet fitting 56 and a pair of air outlet fittings 58 and 60 (FIG. 7). The spool and internal passages of valve 52 are not shown, being of conventional, four-way air valve design to perform the air flow control functions described hereinafter. The spool is preferably of the detented type, having two distinct positions between which it is movable by the air supply in a manner to be described. Adjustable air flow controls 53, 53′ are provided in conventional fashion to permit selective control of air pressure, and thus the speed of the operations described later.

Valve adjusting plate 54 is slidably mounted on valve mounting plate 34 by means of screw 62, extending through elongated slot 64 in the mounting plate into tapped opening 66 in the adjusting plate. Plate 54, and thus valve 52, are movable in forward and rear directions with respect to the frame by means of lead screw 68 which is rotatable in opening 70 of rear frame member 28, and axially restrained with respect thereto, and threadedly engaged with tapped opening 72 in upstanding end portion 74 of adjusting plate 54.

Operating rod 76 extends from the front end of pneumatic cylinder 78. Conical element 80 is mounted on the forward end of rod 76, the other end of which is attached in the usual manner to a piston (not shown) within cylinder 78. A threaded extension 82 on the rear of cylinder 78 passes through opening 84 in mounting plate 86 and is securely engaged by nut 88 to mount the cylinder on plate 86. Fixed support rails 30 and 32 pass through openings in mounting plate 86, whereby the plate and cylinder 78 are slidably movable in forward and rear directions upon the support rails.

A pair of blades 90, 90′ are secured by screws 92, 92′ to blade mounting blocks 94, 94′. Pivot posts 96, 96′ extend upwardly from arms 98, 98′ respectively. Arms 98, 98′ are rotatably mounted on pivot posts 102, 102′ respectively, extending fixedly from arm support member 104 which is slidably movable in forward and rear directions on support rails 30 and 32. The ends of arms 98, 98′ rearwardly of their pivot mountings cross one another and include elongated slots 102,102′. Screws 105, 105′ secure blocks 94, 94′ to pivot posts 96, 96′ and screws 106, 106′ secure arms 98, 98′ to pivot posts 102, 102′ for pivotal movement thereon.

The forward end of rod 108 is slidably received in collar 110, fixedly attached to and extending rearwardly from arm support member 104, the opposite end of rod 108 extends into opening 112 of mounting plate 86, where it is fixedly secured by screw 114. Fixed post 116 extends upwardly from rod 108, passing through slots 102, 102′ of arms 98, 98′. Mounting post 118 likewise extends upwardly from rod 108. Hollow actuator tube 120 extends loosely through an opening in post 118 for axially adjustable movement thereon; the position of tube 120 is releasably fixed by manually operable set screw 122. Plunger 124 is mounted in the forward end of tube 120 for limited movement between a forward position, wherein air bleed opening 126 is uncovered, and a rear position, wherein a portion of plunger 124 within tube 120 blocks opening 126.

Figure 8:
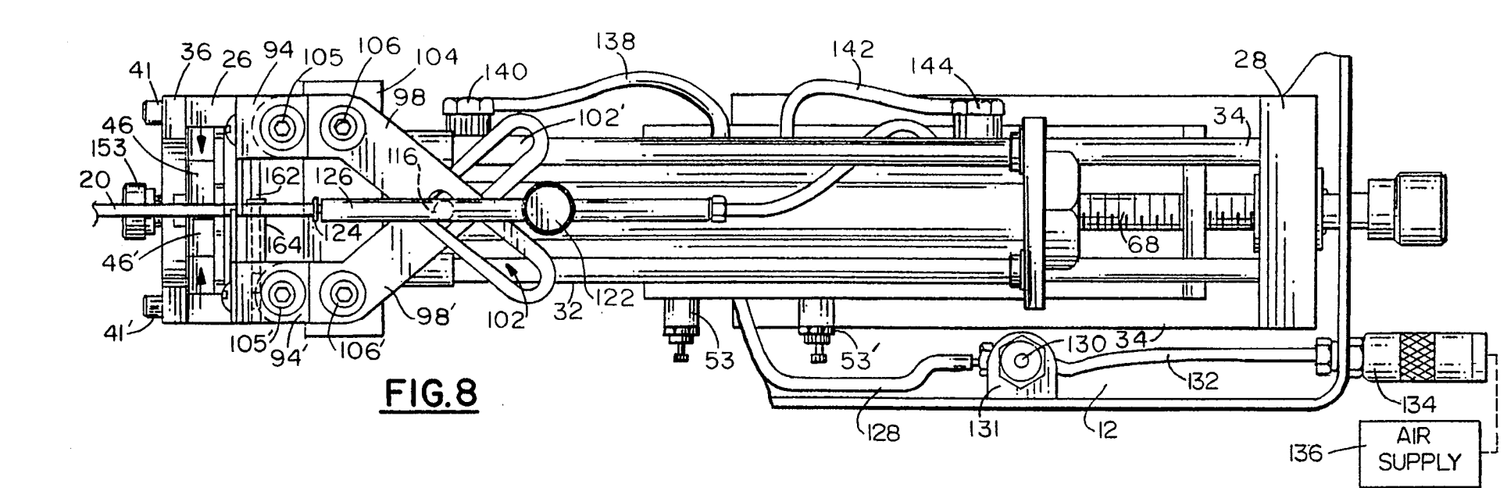
FIG. 8 is a top plan view.
Figure 9:
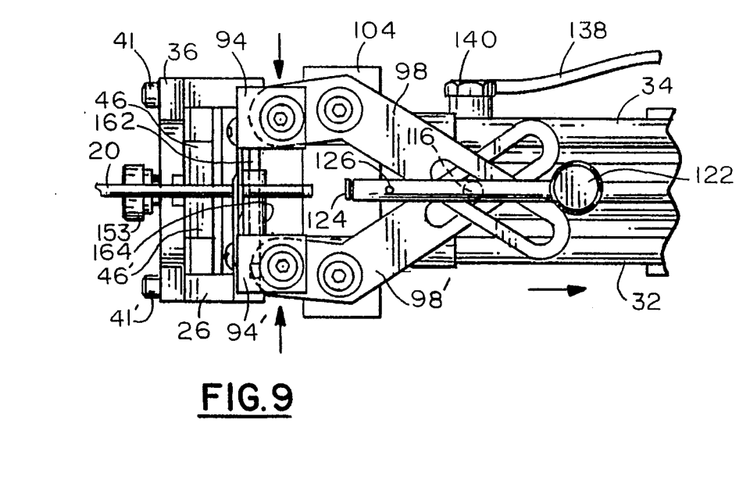
FIGS. 9 and 10 are fragmentary, top plan views of the front portion of the apparatus showing, together with FIG. 8, sequential movement of various parts thereof.

As seen in FIG. 8, air inlet fitting 56 of valve 52 is connected by flexible air tube 128 to a safety shut-off valve operated by plunger 130, and thence by air tube 132 to connector 134, extending through an opening in casing base 12. The valve associated with plunger 130 is fixedly mounted by bracket 131 on casing base 12. As diagrammatically indicated, connector 134 is connected to a source of pressurized air 136. Plunger 130 is spring biased to a position wherein the valve with which it is associated closes to block flow of air from tube 132 to tube 128. A bracket (not shown) fixedly connected to the inside of cover 14 contacts and depresses plunger 130 when the cover is in the closed position to open the valve and permit air flow for operation of the apparatus. Air flow is blocked to prevent operation by spring-biased movement of plunger 130 of the apparatus when cover 14 is open.

Air outlet fitting 58 of valve 52 is connected by air tube 138 to inlet fitting 140 at the forward end of cylinder 78. Likewise, valve outlet fitting 60 is connected by tube 142 to inlet fitting 144 at the rear of the cylinder.

When the spool within valve 52 is in its forward position, communication is established between air supply 136 and the rear end of cylinder 78; when the spool is in its rearward position, the air supply communicates with the forward end of cylinder 78. Positive air pressure is provided to either the forward or rear end of the cylinder at all times when the unit is in operation.

Openings are provided for escape of air from both ends of valve 52, and the position of the spool is shifted by blockage of one or the other of these "air bleed" openings. Previously mentioned opening 126 in tube 120 communicates, when plunger 124 is in its forward position, via tube 120 and flexible air tube 146, with the rear end of valve 52. Opening 148 communicates with the forward end of valve 52 when plunger 150 is in its forward position, toward which it is spring biased. The position of the spool is shifted by blocking one of the air bleed openings while the other is open. For example, if the spool is in its rearward position and both of openings 126 and 148 are open, movement of plunger 124 to block opening 126 provides a positive air pressure at the rear end of valve 52 sufficient to shift the spool to its forward position. Likewise, closing opening 148 by rearward movement of plunger 150, with opening 126 open, will provide positive air pressure at the forward end of the valve and shift the spool to its rearward position.

Figure 11:
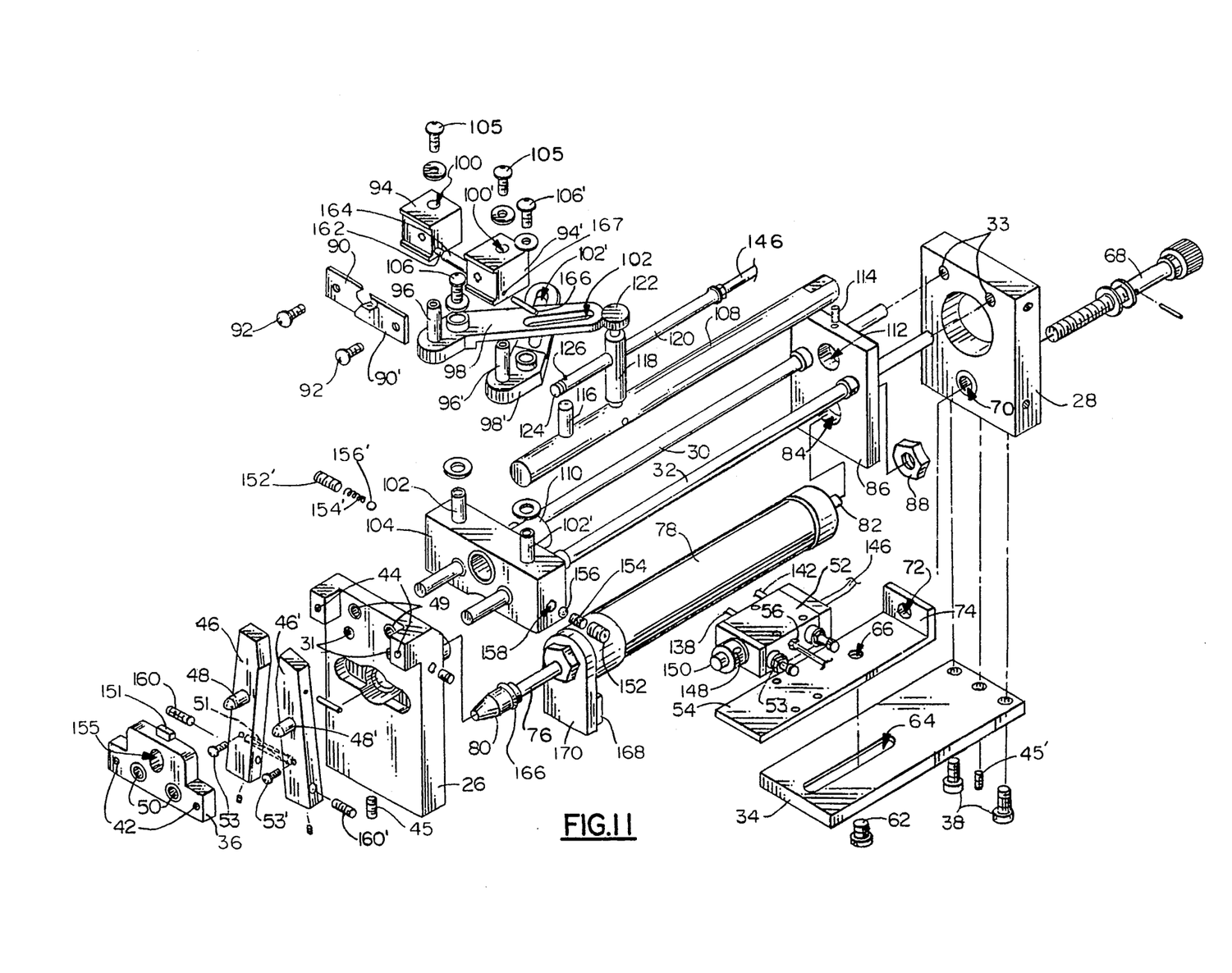
FIG. 11 is an exploded perspective view of elements of the apparatus.

A complete cycle of operation of the apparatus in gripping the workpiece, followed by cutting, severing and stripping a slug of insulation from a portion of a conductor extending a predetermined distance from the terminal end thereof will now be described. At the beginning of a cycle the movable elements are in the position shown in FIG. 7 and in solid lines in FIG. 6. Arm support member 104 is at the forward limit of its travel, defined by engagement of spring-loaded ball detents in peripheral grooves in support rails 30 and 32 As seen in FIG. 11, screws 152, 152' springs 154, 154' and ball detents 156, 156' are inserted in openings in opposite sides of member 104. When member 104 is at the forward limit of its travel, detents 156, 156' are urged by springs 154, 154' into resilient engagement with groove 159 in support rail 32, seen in the cutaway portion of FIG. 6, and a like groove (not shown) in support rail 30. Screws 152, 152' may be positioned to provide a desired bias on ball detents 156, 156'.

Cylinder 78, mounting plate 86 and rod 108 are also at the forward limit of their travel, defined by fixed post 116 on rod 108 engaging the forward ends of slots 102, 102' in pivoted arms 98, 98', as shown in FIG. 8 Operating rod 76 is at the rearward limit of its travel, permitting clamp arms 46, 46' to assume an open position defined by contact of the inner ends of adjustable stop screws 160, 160' with conical element 80 near the forward end thereof. The limit of rearward travel of rod 76, and thus of conical element 80, is defined by contact of O-ring 161 with inner surface 163 of a recess in front frame member 26 (see FIGS. 6 and 7). The spool of valve 52 is in its rearward position with positive air pressure being provided to the forward end of cylinder 78. Both plungers 124 and 150 are in their forward positions, whereby both air bleed openings 126 and 148 are open.

Operation is initiated by axial insertion of wire 20 through slot 18, as indicated in FIG. 1. Since the apparatus may operate upon wires of different diameters, an adjustable wire rest is provided to assist in vertical centering of the wire in the blades. Wire rest 151 is vertically slidable in a groove on the rear side of clamp plate 36 and is engaged by a screw having manually engageable knob 153. The stem of the screw passes through vertically elongated slot 155, providing limited vertical adjustment of wire rest 151 which is releasably held in the desired position by tightening the screw to frictionally engage clamp plate 36 between wire rest 151 and knob 153.

Wire 20 is axially advanced until the terminal end thereof contacts and moves plunger 124 rearwardly, blocking air flow through opening 126. As previously explained, this causes the spool to shift to its forward position, thereby shifting positive air pressure from the forward to the rear end of cylinder 78. The initial consequence of providing air pressure to the rear end of the cylinder is to move the piston and operating rod 76 forwardly, thereby moving the progressively larger diameter of conical element 80 between stop screws 160, 160'. This causes clamp arms 46, 46' to pivot, against the bias of spring 51, moving the upper ends of the arms toward one another, as indicated by the arrows in FIG. 8, until they engage wire 20. The opposing surfaces of clamp arms 46, 46' are preferably ridged, roughened, etc. (i.e., other than smooth) to enhance the gripping of wire 20.

Continued application of air pressure to the rear end of cylinder 78 tends to expand the volume rearwardly of the piston with the air pressure exerting a forward force on the piston and a rearward force on the back of the cylinder. This results in rearward movement of cylinder 78, and with it mounting plate 86 and rod 108. As rod 108 moves rearwardly, fixed post 116 moves in slots 102, 102', causing arms 98, 98' to pivot about posts 102, 102', thus moving blocks 94, 94' and blades 90, 90' toward one another, as indicated by the arrows in FIG. 9. It will be noted that, as arms 98, 98' pivot relative to arm support 104, blocks 94, 94' also pivot about posts 102, 102' relative to the arms. This double pivot arrangement permits blocks 94, 94' and their attached blades 90, 90' to maintain their relative longitudinal orientations as they move toward and away from one another. That is, in moving from the FIG. 8 to the FIG. 9 position, as indicated by the arrows in FIG. 9, lateral movement of blades 90, 90' is linear rather than arcuate, as is the case when the blades are fixedly mounted upon the pivot arms according to conventional practise.

The lateral movement of blocks 94, 94' and blades 90, 90' is constrained to a linear path by rod 162 and sleeve 164, extending toward one another from fixed connections to blocks 94 and 94', respectively. Rod 162 is telescopically movable into and out of sleeve 164 as blocks 94 and 94' move toward and away from one another. The limit of movement of blocks 94, 94' and thus of the opposed, V-shaped cutting edges of blades 90, 90', toward one another is defined by contact of the end of rod 162 with stop screw 166 (FIG. 11) which is threadedly received in opening 167 in block 94'. Thus, the depth of the cut made by blades 90, 90' may be selectively controlled by advancing or retracting stop screw 166. Calibration of the depth, as well as the length (i.e., the distance from the terminal end of wire 20) of the cut are explained later.

Figure 10:
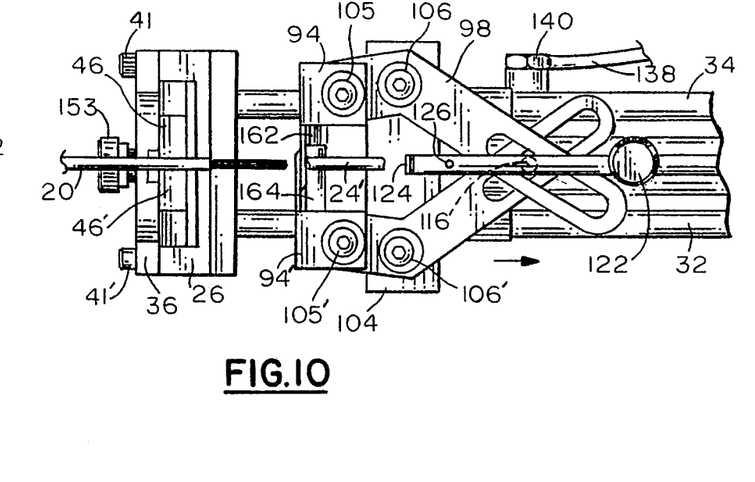

When the end of rod 162 contacts stop screw 166, arms 98, 98' can no longer pivot in a direction moving blocks 94, 94' toward one another. Since the cutting edges of the blades cooperatively define a four-sided opening, the insulation is not completely severed by movement of the blades radially of the workpiece to cut and engage the insulation. Severing of the slug of insulation is completed by movement of the engaged blades axially of the workpiece while the latter is firmly clamped to resist the axial pulling force of the blades. Consequently, increase of pressure in the rear of cylinder 78 to the required level will cause the cylinder mounting plate 86 and rod 108 to continue their rearward movement. Due to the engagement of post 116 in slots 102, 102', arm support member 104, arms 98, 98' blocks 94, 94' and blades 90, 90' will also move rearwardly, thereby completing the severing of insulation 24 and moving severed slug 24' toward the terminal end of conductor 22, as shown in FIG. 10.

The force required to cause the rearward movement just described must, of course, be sufficient to both sever the insulation and to overcome the retaining force of the ball detents in the grooves near the forward ends of support rails 30 and 32. An important feature of the invention resides in the simultaneous application of force (air pressure) on the piston, tending to move rod 76 forwardly, and on the rear end of cylinder 78, tending to move the elements rearwardly to sever and strip the insulation. Thus, as the force increases to the level necessary to sever the insulation and to overcome the detent means which resiliently lock the elements against rearward movement, the clamping force exerted by arms 46, 46' is likewise increased to the level required to maintain wire 20 axially stationary. Since the force required to sever the insulation and move the elements rearwardly will vary, depending on such factors as the type and thickness of insulation, detent force, etc., the present invention automatically provides the amount of clamping force required to maintain the wire axially fixed, while also ensuring through positive-engaging detent means, that severing and stripping do not begin until gripping and cutting are effected. This tends to avoid damage to the wire by unnecessarily high clamping forces, while avoiding malfunction due to insufficient clamping force.

Rearward movement of the elements continues until pad 168 on cylinder stop plate 170, fixedly attached to and extending downwardly from the forward end of cylinder 78, contacts and moves plunger 150 on the forward end of valve 52. Rearward movement of plunger 150, against a spring bias normally holding it in the forward position, closes air bleed opening 148. Since the terminal end of wire 20 has been removed from contact with plunger 124 by the previously described rearward movement of the cylinder and other elements, plunger 124 has moved back to its forward position, permitting air to flow through bleed opening 126.

Closing bleed opening 148 with bleed opening 126 open applies air pressure to the forward end of valve body 52, shifting the spool to its rearward position. Positive air pressure is thus shifted from the rear to the forward end of cylinder 78. This moves the piston within cylinder 78 rearwardly, thus retracting operating rod 76 and conical element 80 until 0-ring 161 contacts surface 163. This permits spring 51 to return clamp arms 46, 46' back to their open position.

After the piston has reached the rearward limit of its travel, the air pressure acting on the forward end of cylinder 78 moves the cylinder, and with it mounting plate 86 and rod 108, forwardly on support rails 30 and 32. Arm support member 104 remains stationary until post 116 reaches the forward ends of slots 102,102' having first rotated arms 98, 98' to the position wherein blocks 94, 94' are at the outer limits of their travel. Continued forward movement of cylinder 78 then moves arm support member 104, and its associated elements, forwardly until ball detents 156, 156' engage grooves 160 in support rails 30 and 32.

Of course, as soon as cylinder 78 has moved forwardly a sufficient distance to remove pad 168 from contact with plunger 150, the spring bias moves the plunger to its forward position, thereby unblocking bleed opening 148. However, this does not shift the position of the spool since bleed opening 126 is also unblocked. Thus, while positive air pressure continues to be applied to the forward end of cylinder 78, both bleed openings 126 and 148 are unblocked and the elements will remain in their last-described positions until plunger 124 is again moved by insertion of another workpiece to initiate another cycle. The positive air pressure in the forward end of cylinder 78 maintains the piston in its rearward position, ensuring that conical element 80 remains retracted and clamping arms 46, 46' are pivoted to their open position until after another workpiece is inserted to move plunger 124.

It will be noted that a complete cycle is performed entirely automatically upon insertion of a workpiece whose terminal end contacts and moves by a small amount (e.g., 1/32" or less) plunger 124. Upon initiation of a cycle, operation is entirely automatic using only a single pneumatic cylinder and spool valve. The only spring-biased elements, other than ball detents 156, 156' and plunger 150, are clamp arms 46, 46' the latter being biased to their open position and the closing or clamping force exerted on the wire being varied in proportion to the pulling force required to sever the insulation.

The depth of cut is defined by the limit of travel of blades 90, 90' toward one another. As previously explained, this is a function of the initial positioning of the blades on blocks 94, 94' and by manual adjustment of stop screw 166. The length of cut, i.e., the axial distance from the terminal end of the workpiece to the position of the cut, is determined by the axial position of tube 120 as manually adjusted by sliding tube 120 through the opening in mounting post 118 and tightening set screw 122 to fix the axial position of the tube. The strip length, as determined by the distance of rearward travel of cylinder 78 and associated elements, is also manually adjustable by means of lead screw 68 to shift valve adjusting plate 54 forwardly or rearwardly in the manner previously explained. This permits the severed slug of insulation or other covering layer(s) to be completely (FIG. 2) or only partially (FIG. 3) removed from the core material.

The necessary adjustment of stop screw 166 and tube 120 to provide the desired depth and length of cut, respectively, may be quickly performed by inserting a sample workpiece between blades 90, 90'0 and against plunger 124. With the blades closed against the bare conductor, stop screw 166 is advanced until it contacts the end of rod 162. The screw may be advanced one or more additional turns, if desired, to ensure that the blades do not contact the conductor. Wire rest 151 is manually adjusted to the proper height with the wire substantially centered in the blades.

Figure 12:
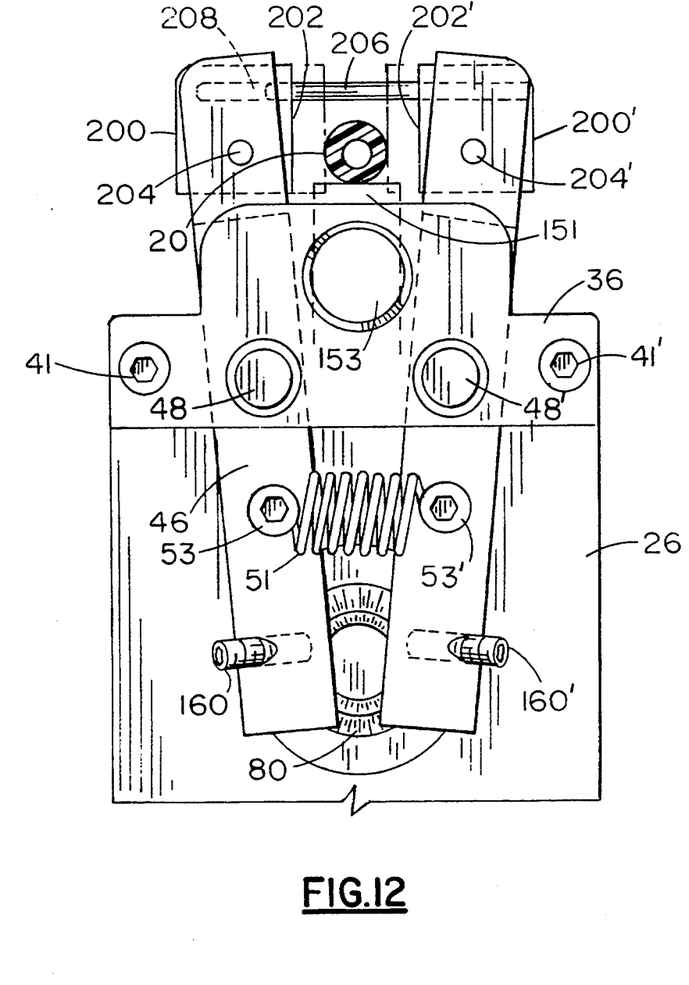
FIGS. 12 and 13 are fragmentary, front elevational and top plan views, respectively, of an alternate embodiment of portions of the apparatus.
Figure 13:
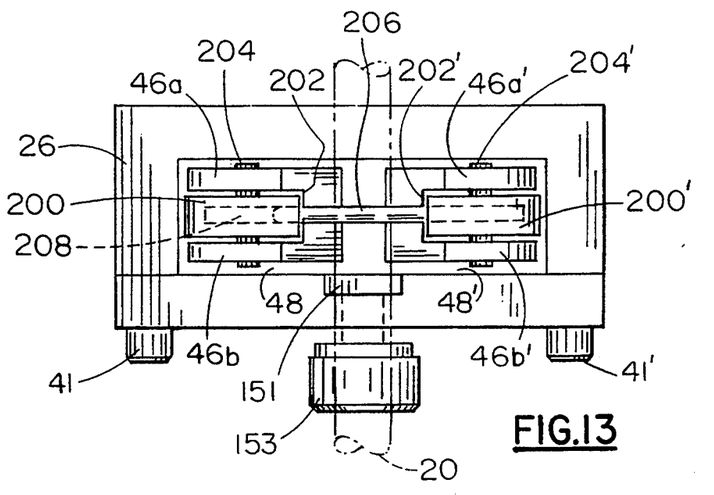

Turning now to FIGS. 12 and 13, an alternate embodiment of the elements which restrain the workpiece against axial movement is shown. In relatively heavy-duty applications, wherein the apparatus may operate upon workpieces one inch or more in diameter and high pulling forces are required for severing and stripping, problems may be encountered with arcuate movement of the opposing clamping surfaces to engage the workpiece. For example, if the clamping surfaces are at a divergent angle relative to one another as a large clamping force is applied, the workpiece tends to slip on the clamping surfaces away from the desired radial position. Thus, although it is expedient to translate linear motion of the cylinder operating rod to rotary motion of the clamping arms, it is desirable that the clamping surfaces remain parallel during such movement.

Common reference numerals are used to denote elements which may be of the same configuration as in the previous embodiment, appropriately enlarged for the intended, heavy-duty application. Such common elements include front plate 26 and clamp plate 36, mutually attached by screws 41, 41', and wire rest 151, releasably secured in a desired vertical position by knob 153. Conical element 80 is also movable and operable in the same manner, acting on stop screws 160, 106' to rotate arms 46, 46' about pivot posts 48, 48', assisted by spring 51

In the present embodiment, clamp arms 46, 46' are divided at their upper ends by open slots into two opposing portions. As seen in FIG. 13, the upper end of arm 46 is divided into portions 46a, 46b, and the upper part of arm 46' is divided into portions 46'a and 46'b. Clamp block 200, having clamping surface 202, is pivotally mounted by pin 204 in the open slot between portions 46a and 46b of arm 46, and clamp block 200' having clamping surface 202', is pivotally mounted by pin 204' in the open slot between portions 46'a and 46'b of arm 46'. Guide pin 206 extends fixedly from clamp block 200' and is slidingly received in opening 208 in clamp block 200. Thus, as arms 46, 46' pivot about posts 48, 48', respectively, clamp blocks 200, 200' also pivot about pins 204, 204', respectively, with guide pin 206 moving in and out of opening 208 to ensure that clamping surfaces 202, 202' remain parallel to one another. Clamp blocks 200, 200' are shown in phantom lines in FIG. 12 with surfaces 202, 202' engaging workpiece 20.

From the foregoing, it may be seen that the objects of the invention are advantageously achieved by the disclosed embodiments wherein the workpiece clamping means, as well as the blades, may be mounted for reciprocal movement in a manner combining the advantages of both pivotal and linear motion. Furthermore, positive restraint of movement of the blades to sever and strip the slug of insulation by resilient detent means, and simultaneous application of force to both the blade movement means and the workpiece clamping means automatically adjusts the clamping force to the required level and ensures reliable operation. Many modifications are, of course, possible within the scope of the invention. For example, the detent means may resiliently couple elements other than arm support member 104 and guide rails 30 and 32, provided some element(s) movable to initiate severing of the slug is coupled to some fixed element(s). Also, if in some intended applications the motive power provided by a single cylinder is inadequate, and/or the required stroke is objectionably long, one or more auxiliary cylinders with appropriate control means may be provided.

What is claimed is:

1. Apparatus for severing a layer of coating material surrounding a coated, elongated filamentary member and partially or fully stripping the severed portion of said material from a free end of said member, said apparatus comprising:

a) clamping means movable radially with respect to said member between an open position, wherein said member may be axially wherein said clamping means exerts a radial clamping force upon said member to restrain axial movement of said member;

b) blade means movable radially with respect to said member between an outer position, wherein said blade means are spaced from said member, and an inner position, wherein said blade means passes at least partially through said coating material at a predetermined position, said blade means further being axially movable with respect to said member from an initial position toward said free end of said member, when said clamping means are in said closed position and said blade means are in said inner position, to exert an axial force severing said material at said predetermined position and moving the severed portion axially on said member toward said free end thereof;

c) motive power means for moving said clamping means and said blade means;

d) first means connecting said power means to said clamping means to effect movement of said clamping means from said open to said closed position and to vary said clamping force exerted by said clamping means on said member;

e) second means connecting said power means to said blade means to effect movement of said blade means from said outer to said inner position;

f) third means connecting said power means to said blade means to effect movement thereof axially with respect to said member from said initial position toward said free end thereof;

g) fixed frame means having a longitudinal axis; and h) resilient means providing a locking force between said fixed frame means and said third means connecting means permitting movement of said blade means away from said initial position only in response to application of a force by said motive means to said third connecting means sufficient to overcome said locking force.

2. The apparatus of claim 1 wherein said power means is a pneumatic cylinder.

3. The apparatus of claim 2 wherein said cylinder includes an axially extensible and retractable operating rod forming a portion of said first connecting means.

4. The apparatus of claim 3 and further including means mounting said cylinder upon said frame means for reciprocal movement relative to said fixed frame means and parallel to said longitudinal axis.

5. The apparatus of claim 4 wherein said resilient means comprises detent means engageable between said fixed frame and said third connecting means when said blade means are in said initial position.

6. The apparatus of claim 5 wherein said detent means comprises a moveable element, receiving means and biasing means, said moveable element being urged by said biasing means into engagement with said receiving means when said blade means is in said initial position, one of said moveable element and said receiving means being mounted to said blade means for movement therewith into and away from said initial position and the other being mounted to said fixed frame.

7. The apparatus of claim 6 wherein said biasing means comprises a spring applying a predetermined biasing force to said moveable element, said blade means being moveable away from said initial position by application by said power means, through said third connecting means, to said blade means of a force sufficient to overcome said biasing force.

8. The apparatus of claim 7 wherein said moveable element comprises a ball detent and said receiving means comprises a groove.

9. The apparatus of claim 1 wherein said clamping means comprise a pair of arms mounted for pivotal movement of first portions thereof between said open and closed positions, and said first connecting means comprises a conical member movable by said power means between second portions of said arms to effect said pivotal movement.

10. The apparatus of claim 9 wherein said blade means comprise a pair of blades having opposed cutting edges, movable between said outer and inner positions.

11. The apparatus of claim 10 and further comprising means mounting said blades for reciprocal, linear movement of said cutting edges toward and away from one another.

12. The apparatus of claim 11 wherein said power means is a pneumatic cylinder.

13. Apparatus for severing a layer of insulation, or the like, which covers an elongated wire-like member, said apparatus comprising:
   a) clamping means movable radially inwardly with respect to said member to exert a clamping force upon said insulation at a first position, holding said member in a fixed axial position;
   b) blade means having at least one cutting edge movable radially inwardly with respect to said member to cut partially through said insulation at a second position, spaced axially from said first position;
   c) severing means movable axially with respect to said member to exert an axial pulling force on said insulation sufficient to server the latter at said second position;
   d) motive power means coupled to each of said clamping means, blade means and severing means to apply a first motive force to said clamping means, a second motive force to said blade means and a third motive force to said severing means, said third motive force being variable over a range proportionate to the force required to move said severing means; and
   e) power varying means for automatically increasing said first motive force proportionately to said third motive force over the full range of said third motive force, whereby said clamping force is great enough to hold said member in said fixed axial position at the maximum of said axial pulling force exerted by said severing means.

14. The apparatus of claim 13 wherein said power means comprises a pneumatic cylinder having an extensible and retractable operating rod.

15. The apparatus of claim 14 and further including fixed frame means and means mounting said cylinder for movement relative to said frame means.

16. The apparatus of claim 15 wherein said rod is movable relative to said frame means to apply said first motive force, and said cylinder is movable relative to said frame means to apply said third motive force.

17. The apparatus of claim 16 wherein said cylinder and said rod are reciprocally, linearly movable substantially parallel to the axis of a wire-like member clamped by said clamping means.

18. The apparatus of claim 13 wherein said first and second positions are closely adjacent one another.

19. The apparatus of claim 13 wherein said severing means comprises means for mounting said blades for reciprocal, linear movement in a direction away from said clamping means.

20. The apparatus of claim 13 wherein said blade means comprise a pair of blades having opposed cutting edges and further including fixed frame means having a longitudinal axis and means for mounting said blades for movement relative to said frame means in directions perpendicular to said axis to cut said insulation and parallel to said axis to sever said insulation.

21. The apparatus of claim 20 wherein said mounting means comprise a pair of arms mounted upon a support member for pivotal movement about spaced, parallel axes with respect to said frame means, means pivotally connecting said blades to respective ones of said arms at positions spaced from said axes, and means constraining movement of said blades relative to one another in a linear direction in response to pivoting means of said arms.

22. Apparatus for cutting at least partially through a covering layer of material on an elongated, wire-like member, said apparatus comprising:
   a) a pair of blades, each having a cutting edge;
   b) a first support member;
   c) a pair of arms individually mounted upon said first support member for pivotal movement with respect thereto about spaced first and second axes;
   d) a pair of second support members to which said blades are respectively, fixedly attached, each of said second support members being pivotally attached to respective ones of said pair of arms for pivotal movement of said second support members with respect to said arms about respective third and fourth axes, spaced from one another and from said first and second axes; and
   e) means for constraining movement of said second support members, in response to simultaneous, equal movement of said arms in opposite directions over an operating range about said first and second axes, to substantially linear paths with said blade edges moving toward and away from one another.

23. The apparatus of claim 22 wherein said pair of arms each include forward and rear end portions on opposite sides of said first and second axes, and said pair of second support means are respectively pivotally attached to said forward end portions.

24. The apparatus of claim 22 and further including stop means limiting movement of said blade means toward one another to a predetermined spacing.

25. The apparatus of claim 24 and further including adjusting means for selectively moving said stop means to vary said predetermined spacing.

26. The apparatus of claim 25 wherein said constraining means comprises a pair of linearly telescoping members respectively mounted on and movable with said pair of second supports.

27. The apparatus of claim 26 wherein said stop means comprises an element mounted upon one of said second supports in the path of the one of said telescoping members mounted on the other of said second supports.

28. In apparatus for cutting at least partially through a covering layer of material on an elongated, wire-like member and exerting an axial pulling force on said layer to strip a severed portion thereof from said member, clamping means for exerting a radial force on said layer to prevent axial movement of said member as said pulling force is applied, said clamping means comprising:
  a) a fixed frame;
  b) a pair of arms pivotally mounted upon said fixed frame for movement about respective, spaced, parallel, first and second axes;
  c) means for imparting movement to said arms about said first and second axes;
  d) a pair of clamp members, each having a clamping surface, said clamp members being respectively pivotally mounted to said arms for movement about respective third and fourth axes parallel to one another and to said first and second axes; and
  e) means constraining movement of said clamp members, as said arms are moved about said first and second axes, to parallel, straight-line paths, toward and away from one another, said constraining means comprising a pair of linearly telescoping members respectively mounted upon and moveable with said clamp members.

29. The invention according to claim 28 wherein said constraining means maintains said clamping surfaces in planes parallel to one another during movement of said clamp members toward and away from one another.

30. The invention according to claim 28 wherein said means for imparting movement to said arms comprises means for varying the force applied to move said arms, and thereby said clamp members toward one another over the full range of force applied to said arms and clamp members.

31. In apparatus for cutting at least partially through a covering layer of material on an elongated, wire-like member and exerting an axial pulling force on said layer to strip a severed portion thereof from said member, clamping means for exerting a radial force on said layer to prevent axial movement of said member as said pulling force is applied, said clamping means comprising:
  a) a fixed frame;
  b) a pair of arms pivotally mounted upon said fixed frame for movement about at least one axis;
  c) means for imparting movement to said arms about said at least one axis;
  d) a pair of clamp members, each having a clamping surface, and a pair of pivotal mountings by which said clamp members are respectively pivotally mounted to said arms at positions spaced from said at least one axis for movement with said arms about said at least one axis and relative to said arms about said pivotal mountings of said clamp members to said arms; and
  e) means constraining movement of said clamp members and said clamping surfaces, as said arms are moved about said at least one axis, to parallel, straight-line paths, toward and away from one another.

* * * * *